May 5, 1953 — W. KOFLER — 2,637,068
SAUSAGE MAKING MACHINE
Filed Dec. 9, 1949 — 4 Sheets-Sheet 1
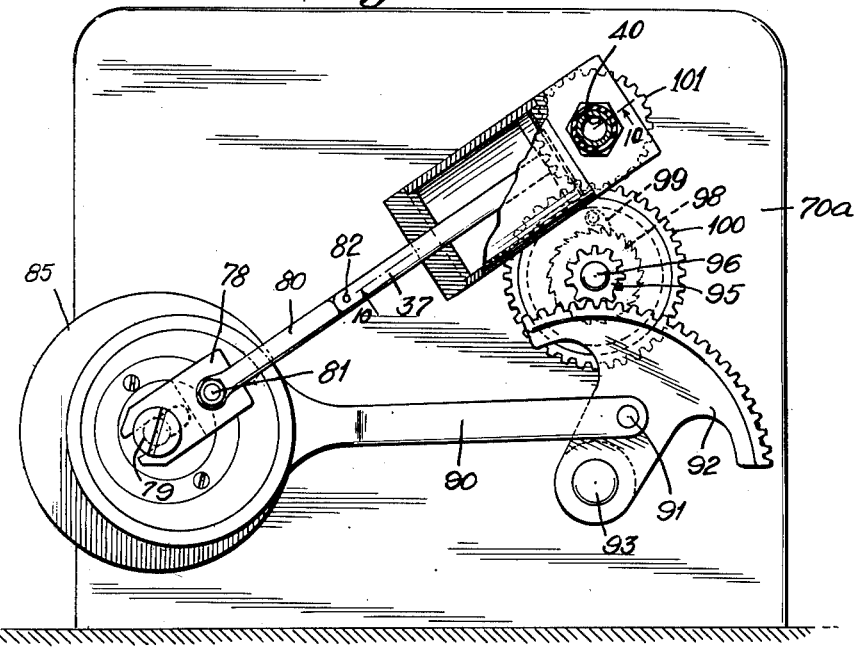
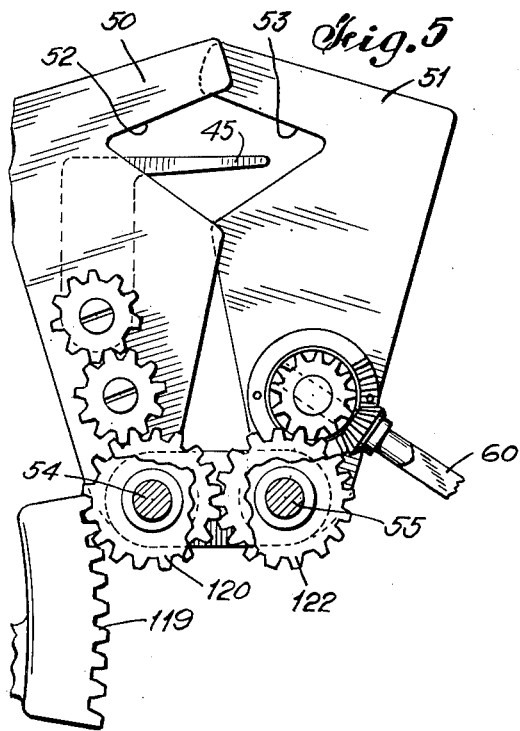
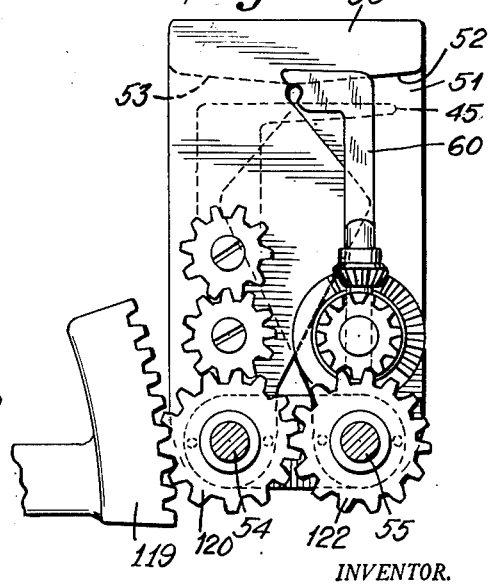
INVENTOR.
WILLIAM KOFLER
BY Samuel J. Stoce
ATTORNEY May 5, 1953 W. KOFLER 2,637,068
SAUSAGE MAKING MACHINE
Filed Dec. 9, 1949 4 Sheets-Sheet 2
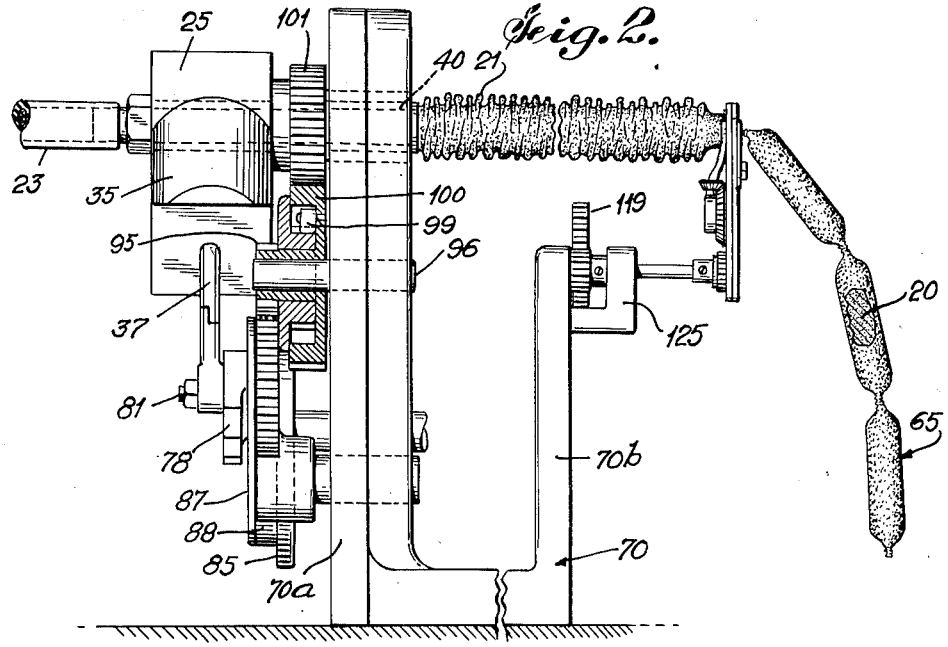
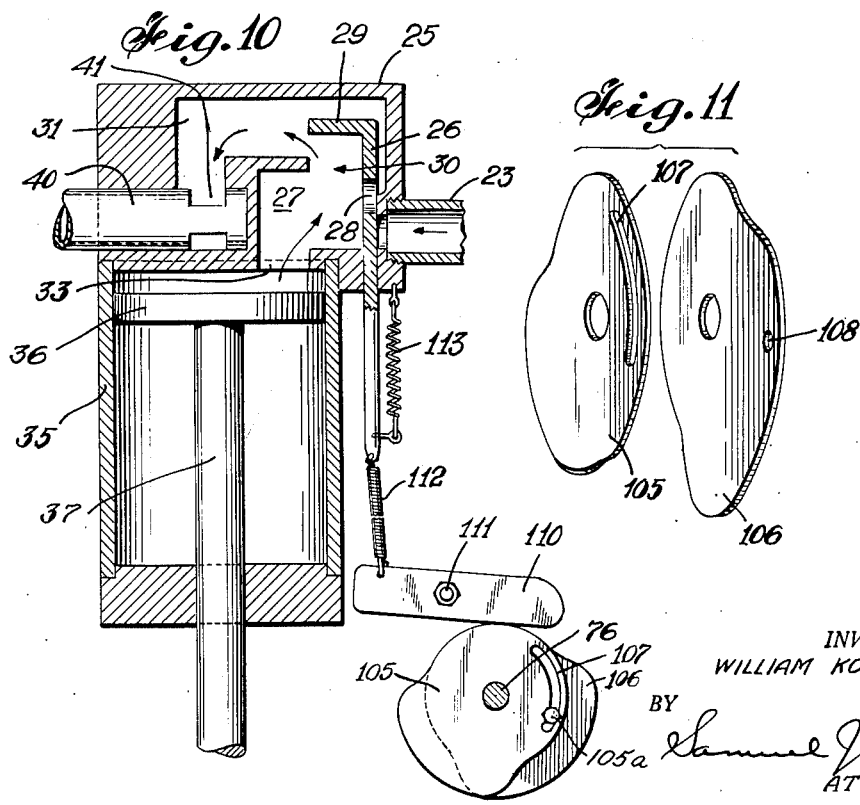
INVENTOR.
WILLIAM KOFLER
BY
ATTORNEY

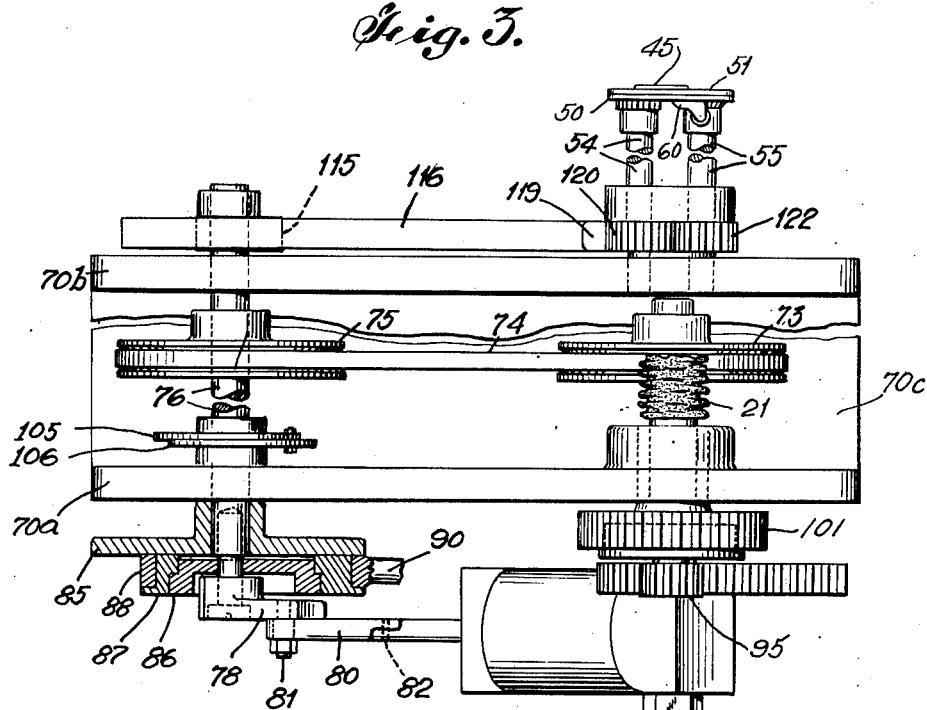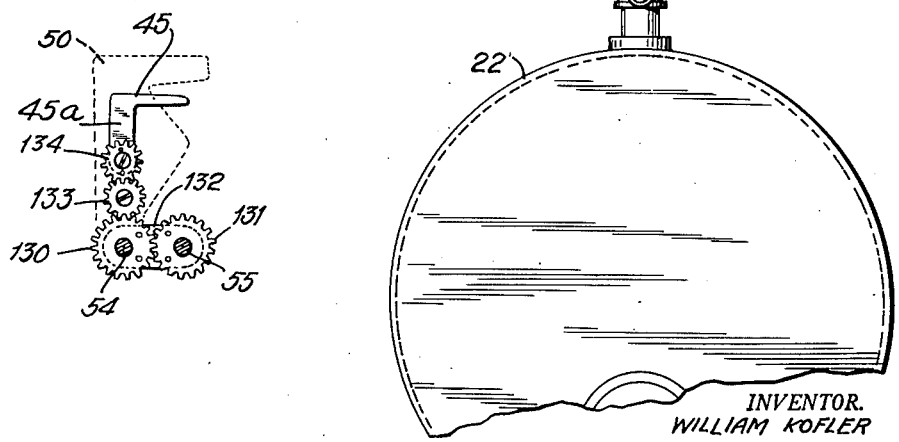

May 5, 1953 W. KOFLER 2,637,068
SAUSAGE MAKING MACHINE
Filed Dec. 9, 1949 4 Sheets-Sheet 4
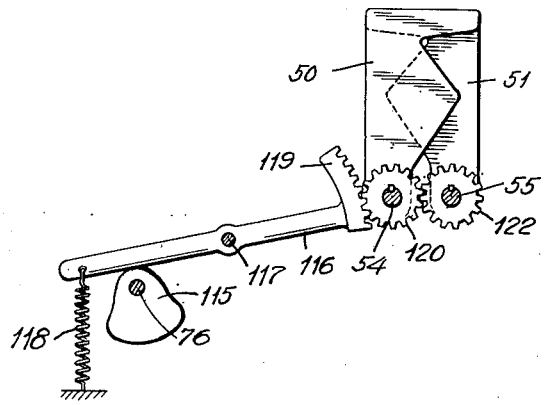
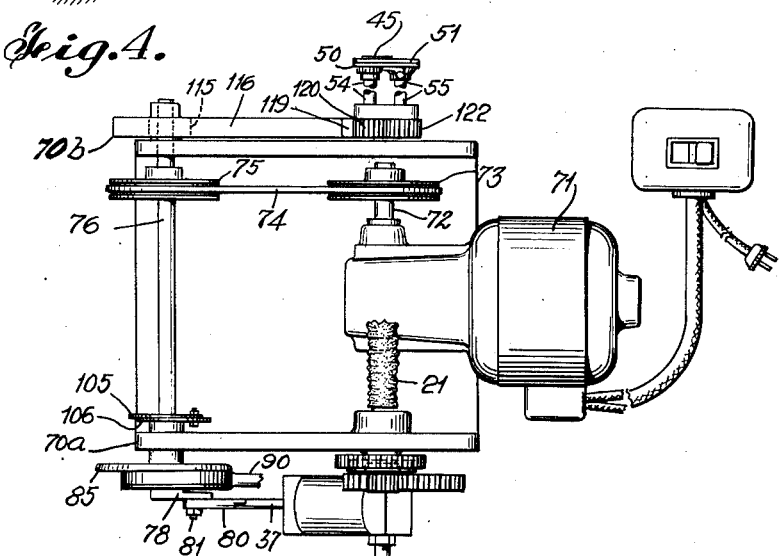
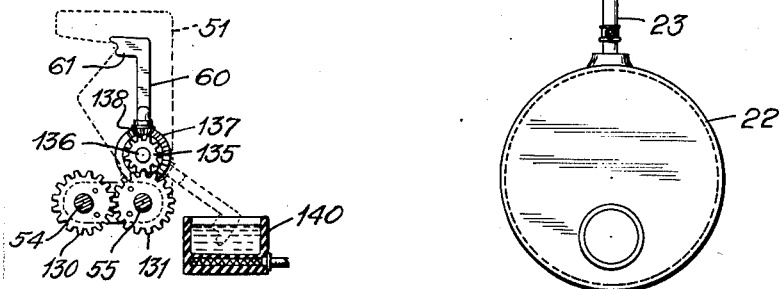
INVENTOR.
WILLIAM KOFLER
BY
*Samuel J. Stoel*
ATTORNEY Patented May 5, 1953

2,637,068

UNITED STATES PATENT OFFICE 2,637,068

SAUSAGE MAKING MACHINE

William Kofler, New York, N. Y.

Application December 9, 1949, Serial No. 132,109

1 Claim. (Cl. 17—33)

This invention relates to a sausage making machine. More specifically, it relates to a machine which starts with ground meat and natural or synthetic casing and produces therefrom linked sausages ready for sale and consumption. The machine introduces predetermined quantities of ground meat into the casing at predetermined spaced intervals, and it then clinches, glues and twists the casing in the spaces which separate the meat. The process is continuous, intermittently so, for the full length of the casing which may have a length of approximately twenty feet, or less or more.

It is accordingly a principal object of this invention to provide a sausage making machine of the character described which includes means for tightly engaging the casing during the clinching and twisting operations so that these operations will be successful at all times and irrespective of whether the casing is natural or synthetic. More specifically, the present machine includes suction means for insuring tight engagement between the casing on the one hand and the feeding and twisting horn on the other hand. This suction means prevents relative movement between the casing and the horn when the horn rotates during the course of the twisting operation. Since there is positive rotation of the horn during the course of the twisting operation, there will be positive rotation of the casing and hence the casing will be caused to twist without difficulty.

Another important object of this invention is the provision of a sausage making machine of the character described wherein a glue applicator is provided for applying glue to those parts of the casing which are twisted by the machine. The glue is of a type which sets almost instantaneously and it holds the twisted parts of the casing in permanently twisted condition. This is an extremely important feature of the present machine since it obviates the need of tying the casing to insure the separate identity of the several sausage links.

Still another important object of the present invention is the provision of a sausage making machine of the character described which includes means for supporting the casing during the clinching and twisting operations to prevent shearing or cutting of the casing by the clinching members. A lifter or lifting mechanism is provided in the present machine which lifts the stuffed casing into substantially axial or longitudinal alignment with the feeding and twisting horn. It also raises the casing above those parts of the clinching mechanism which would normally have the tendency to shear the casing. The lifter not only elevates the casing to proper clinching and twisting position but it also holds the casing in such position for the duration of the clinching and twisting operations. Hence damage to the casing by reason of these operations is clearly averted.

A still further object of this invention is the provision of a sausage making machine of the character described which is extremely compact in its construction and it is adapted to occupy a space which is only a fraction of the space which sausage making machines of the prior art have required. The mechanism is compact and its parts are relatively few. They may very readily be disassembled for cleaning and other purposes. This, too, is a very important feature of the present invention since the sausage making machines of the prior art are very difficult to maintain in a clean and sanitary state.

A preferred form of this invention is shown by way of illustration in the accompanying drawing in which:

Fig. 1 is an end view, partly broken away and in section, showing that part of the machine which receives the meat from the meat container or tank.

Fig. 2 is a front view of the machine showing part of the casing on the feed horn and part of the casing stuffed and twisted to form sausages.

Fig. 3 is a top view of the machine, on an enlarged scale, showing the meat tank or container connected to and feeding said machine.

Fig. 4 is another top view of the machine, on a reduced scale showing the location of the electric motor which drives it and also showing the manner in which the motor is attached to it.

Fig. 5 is an enlarged view of the lifting, clinching and gluing mechanisms, showing said mechanisms in open or inoperative positions.

Fig. 6 is a similar view showing said lifting, clinching and gluing mechanisms in operative positions.

Fig. 7 is a detailed view of the lifting mechanism, said view being on a greatly reduced scale.

Fig. 8 is a detailed view of the clinching mechanism, said view being on a reduced scale.

Fig. 9 is a detailed view, on a reduced scale, of the gluing mechanism.

Fig. 10 is a sectional view, on the line 10—10 of Fig. 1, of the meat stuffing mechanism.

Fig. 11 is an exploded, perspective view of the two cam elements shown in Fig. 10.

The machine shown in the drawing starts with two raw materials, the ground meat 20 and the casing 21. The ground meat is placed under pressure in a tank or container 22 and a tube or pipe line 23 connects said tank to the machine proper. The pressurized meat in the tank is caused to flow through tube 23 into the machine. Both a pushing and a pulling force is applied to the meat: the pressure in the tank pushes the meat and suction developed in the machine pulls the meat. As Fig. 10 clearly shows, the meat is fed through tube 23 into a housing 25 which is part of the machine under discussion and it is in said housing that the sausage making cycle begins.

A sliding valve 26 controls the flow of the meat into housing 25 and more specifically, into chamber 27 in said housing. A hole 28 is formed in said valve and when said hole is brought into registration with tube 23, the meat is free to flow into chamber 27. When, on the other hand, the hole is out of registration with said tube, the flow of meat into chamber 27 ceases. Valve 26 has an end piece 29 which projects at right angles thereto. This end piece constitutes a valve member with respect to a passageway 30 which is formed between chamber 27 in housing 25 and a second chamber 31 in said housing. When hole 28 is in registration with tube 23, valve piece 29 blocks opening 30 and prevents the flow of meat into chamber 31. When hole 28 is out of registration with tube 23, valve piece 29 is removed from passageway 30 and the flow of meat from chamber 27 to chamber 31 is thereby allowed to take place.

Communicating with chamber 27 through an opening 33 is a cylinder 35 which is affixed to housing 25 in any suitable manner. A piston 36 at the end of a piston rod 37 is slidably mounted in the cylinder as shown in Fig. 10. When the piston is pulled downwardly, as view in said Fig. 10, it acts upon the meat in chamber 27 to suck said meat into the cylinder. The timing of the piston and valve 26 is such that hole 28 is in registration with tube 23 when piston is on its downward stroke. Hence the cylinder is in communication with the meat tank through tube 23 and the downward movement of the piston tends to set up sufficient suction to cooperate with the pressurizing agent in the tank to bring the meat into the cylinder. Hole 28 is out of registration with tube 23 when the piston is on its upward stroke. Since passageway 30 is now open (see Fig. 10) the effect of such upward movement of the piston will be to expel the meat from the cylinder and to force it through chamber 27 and into chamber 31. It will shortly be seen that this upward movement of the piston also has the effect of pushing the meat through chamber 31 and into the sausage stuffing or filling mechanism and hence into the casing itself.

Journaled in housing 25 is a hollow shaft 40 which has a hole 41 formed in the side wall thereof. Hollow shaft 40 is so situated in the housing that its side wall is partly exposed to chamber 31. When the hollow tube is in the position which it is shown to occupy in Fig. 10, its hole 41 provides communication between housing chamber 31 and the inside of said shaft. Thus it is that when the piston moves upwardly and pushes the meat up through chambers 27 and 31, the meat will thereby and by the same action be forced into hollow shaft 40 through its said opening 41.

It will be noted in Fig. 2 that hollow shaft 40 constitutes the feeding and twisting horn of the present machine. Casing 21 is mounted on said horn which is as long as the casing requirements dictate. The horn need not, of course, be as long as the casing itself since the casing may be pushed onto the horn in ruffled condition. Several inches of horn will hold several feet of casing. The housing end of the horn is its inlet end and the opposite end thereof is its outlet end. The lifting, clinching and gluing mechanisms are located at the outlet end of the horn as Fig. 2 clearly shows. Figs. 7, 8 and 9 show the construction and operation of the lifting, clinching and gluing mechanisms respectively, and Figs. 5 and 6 show how they cooperate with each other.

Taking the lifting mechanism first, it will be seen that it comprises a lifting bar or finger 45 which is adapted to engage in arcuate reciprocatory movement. Its lowermost position is shown in Fig. 5 and its uppermost position in Fig. 6. When it is in its lowermost position, the casing rests upon it to support it while it is being filled with meat and while at the same time it moves off the horn. What actually happens is this: on the upward stroke of the piston the meat enters the casing and pushes it off the horn, not entirely so, but to the extent of that portion of its length which a single charge of meat occupies. At the conclusion of the meat filling operation, reference being had to a single charge only, lifter 45 commences to move arcuately upwardly to its position of Fig. 6. When it reaches this position, the filled casing is in operative position for the succeeding steps of the sausage making process, said filled casing having been elevated to its said operative position by said upwardly moving lifter.

The clinching mechanism includes two clinching arms 50 and 51 respectively having V-shaped cutouts 52 and 53 respectively on their facing edges. These clinching arms are disposed side to side and they are mounted on shafts 54 and 55 respectively. These shafts constitute their respective pivotal points about which they are adapted to pivot. When they pivot outwardly and away from each other they move into their respective inoperative positions shown in Fig. 5 and when they move inwardly and toward each other, they move into their respective operative positions as shown in Fig. 6. The outward movement of the clinching arms synchronizes with the downward movement of the lifter and the inward movement of the clinching arms synchronizes with the upward movement of the lifter. When the two clinching arms move inwardly and toward each other, their respective V-shaped cutouts tend to diminish in size, that is, each clinching arm tends to cover the V-shaped cutout of the other clinching arm. When the clinching arms are in their innermost positions as shown in Fig. 6, only the vertices of their V-shaped cutouts remain uncovered. Since these vertices are rounded as Fig. 5 clearly shows, they define a circular opening between them when the two clinching arms are in their innermost positions.

The clinching arms clinch the casing between them. The casing projects through their respective V-shaped cutouts and when the two clinching arms move toward each other, they clinch the casing to the proportions of the circular hole which their cutouts define when they are in their Fig. 6 position. To prevent shearing or cutting of the casing as the clinching arms move toward each other, lifter 45 elevates the casing to prevent it from resting upon those edges of the clinching arms which would normally tend to cut or shear said casing.

The gluing mechanism synchronizes its activities with the movements of the lifting finger and the clinching arms. In Fig. 5 (and in dotted lines in Fig. 9) gluing arm 60 is shown with its operative finger 61 in glue receiving or dipping position. In Fig. 6 said gluing arm and its said finger are shown in gluing or glue applying position and it will be understood that said gluing arm and its said finger are arcuately moveable between their two said positions. In addition to being arcuately moveable in the manner indicated, said gluing arm and finger are angularly moveable about the longitudinal axis of said gluing arm. The gluing finger is turned leftwardly of the gluing arm for the glue applying operation, as witness Fig. 6 and it is turned rightwardly of the gluing arm for the glue receiving or dipping operation as the dotted lines in Fig. 9 clearly show. The gluing finger has a small rounded cutout formed therein corresponding to the rounded vertices of the V-shaped cutouts of the clinching arm. When the gluing finger is brought upwardly to its glue applying position, said rounded cutout registers with the circular opening which the two clinching arms define. The gluing finger is thereby brought into contact with the clinched casing and glue is thereby applied to it.

When the lifting, clinching and gluing mechanisms are in their respective operative positions as shown in Fig. 6, the twisting operation takes place. The clinching arms tend to grip the casing and to prevent it from turning or twisting. The downwardly hanging sausages 65 tend to assist the clinching arms in this regard since they are out of axial alignment with the unstuffed casing. The horn on which the unstuffed casing is mounted now commences to rotate and it causes the unstuffed casing which is mounted thereon to rotate with it, and thereby causing said casing to twist. Glue is applied to the twisted area during the course of the twisting operation and glue is adapted to set so quickly that it prevents untwisting of the casing at the conclusion of the twisting operation and when the clinching arms release their grip upon the casing. This process continues until the entire casing is stuffed, twisted and formed into a plurality of interconnected sausages.

It has above been stated that a suction force is applied to the casing to hold it tightly upon the horn during the course of the horn turning and casing twisting operations. This suction force is applied in the following manner: The strokes of piston 36 are synchronized with the movements of the lifting, clinching and gluing mechanisms as well as with the rotation of the horn. The piston moves upwardly to push meat into the casing through opening 41 in the horn during that period of time when the lifting, clinching and gluing mechanisms are in their inoperative positions shown in Fig. 5 as well as shortly before and shortly after they move into their said positions. The downward stroke of the piston begins at the time the lifting, clinching and gluing mechanisms are in their operative positions of Fig. 6 and said downward stroke continues for the duration of the twisting operation. The downward movement of the piston has the effect of applying a suction force to the casing which holds it tightly upon the rotating horn, thereby insuring a successful twisting operation.

The foregoing was descriptive in a functional sense of the operative parts of the machine to present its functions in an understandable manner. The following will be descriptive of those parts of the machine which actuate said operative parts.

The machine has a housing or frame 70 which may be made of cast iron or the like. It is somewhat U-shaped to accommodate an electric motor 71 which is provided with speed reducing gears. A shaft 72 projects outwardly from the gear box of said motor and it carries an adjustable pulley 73. A belt 74 connects adjustable pulley 73 to a second pulley 75 which is mounted on a shaft 76. Shaft 76 is supported by the two upright portions 70a and 70b of the U-shaped housing or frame and it will be noted that the motor is cradled between said upright portions of said housing or frame. The mechanism which actuates piston 36 and the mechanism which causes the horn to rotate are connected to that end of shaft 76 which projects outwardly from upright portion 70a of the frame or housing, and the mechanism which actuates the lifting, clinching and gluing elements is connected to that end of shaft 76 which projects outwardly from upright portion 70b of the frame or housing.

Referring now to the mechanism which actuates piston 36, it will be seen that a crank 78 is adjustably fastened to the first mentioned end of shaft 76 by means of a screw 79. A pivotal connection is provided between said crank and a rod 80 by means of a pin or bolt 81 and said rod 80 is pivotally connected by means of a pin 82 to piston rod 37. Hence when the motor causes the shaft and its crank to rotate, piston rod 37 will be worked and the piston will be caused to engage in reciprocatory movement.

The mechanism which causes rotation of the horn includes a disc 85 which is fixed to shaft 76 and a cam 86 which is fastened to said disc. Cam 86 may comprise a ring shaped member which is attached to disc 85 eccentrically of the longitudinal axis of shaft 76. A cam ring 87 is mounted on cam 86 and a cam following ring 88 rides freely on cam ring 87. It will be noted in Fig. 3 that cam 86 is stepped to lock the cam ring 87 in place against disc 85 and it will also be seen that said cam ring is flanged to hold the cam following ring 88 in place. The cam relationship of cam ring 87 to the longitudinal axis of shaft 76 may be varied by loosening the screws which fasten cam 86 to disc 85 and then turning the cam ring 87 relative to said cam 86. The screws may once again be tightened to fix the cam and cam ring in place relative to disc 85 and hence relative to the longitudinal axis of shaft 76.

Ring 88 is connected to or is integral with an arm 90 which is pivotally connected by means of pin 91 to a rocking arm 92. This rocking arm is pivotally secured to upright portion 70a of the main frame or housing by means of a stud shaft 93. Actually rocker arm 92 constitutes a segment gear which engages a gear wheel 95. When the motor causes shaft 76 to rotate through its belt and pulley connection therewith, the action of cam ring 87 upon the cam following ring 88 will cause arm 90 and rocker arm or segment gear 92 to engage in reciprocatory movement. Since gear wheel 95 meshes with segment gear 92 said gear wheel will also engage in corresponding reciprocatory movement.

Gear wheel 95 is a pinion which runs idle on stud shaft 96 on upright portion 70a of the frame or housing of the machine. Affixed to said pinion is a ratchet wheel 98 which is engaged by a pawl 99. Pawl 99 is pivotally mounted on a gear wheel 100 and said gear wheel 100 is in mesh with another gear wheel 101. The latter gear wheel 101 is fixed to the hollow shaft or horn 40 and it rotates integrally therewith. It will thus be seen that the segment gear 92 will cause pinion 95 and ratchet 98 to engage in reciprocatory rotary movement. The interaction between the ratchet wheel 98 and the pawl 99 will cause gear wheel 100 to engage in intermittent rotary movement in a given direction only, that is, counterclockwise as viewed in Fig. 1. Since gear wheels 100 and 101 are in mesh with each other, the net effect will be to cause the horn to rotate intermittently in a given direction only, to wit, clockwise as viewed in the same Fig. 1.

The valve mechanism shown in Fig. 10 is keyed to the same shaft 76 which actuates the piston 36. A pair of cam plates 105 and 106 respectively are fixedly mounted on shaft 76. One of the cam plates, to wit plate 105, has an arcuate slot 107 formed therein and the other cam plate has a registering hole 108 formed therein. The two plates are fixed to each other by means of a bolt 106a which extends through said slot 107 and said hole 108. The two cam plates may accordingly be changed in position relative to each other in order to provide a longer or shorter cam action, as desired. A cam follower 110 is provided on pivot 111 and it rides freely upon the peripheral or cam edges of said cam plates. A flexible cable 112 connects cam follower 110 to valve 28 and a tension spring 113 connected to said valve tends to pull said valve upwardly as viewed in Fig. 10 and thereby to hold the cam follower in engagement with the two cam plates. Since the cam plates are on the opposite side of pivot 111 from flexible cable 112, the effect of the cam action on said cam follower will be to pull the valve downwardly and the effect of the spring action on said valve is to pull it upwardly.

Affixed to the opposite end of shaft 76 is a cam 115. A rocking arm 116 on pivot 117, is held in engagement with said cam by means of a tension spring 118. At the opposite end of the rocking arm is a segment gear 119 which engages a gear wheel 120. Gear wheel 120 is keyed to shaft 54 above mentioned and it is in mesh with a second gear wheel 122 which is keyed to shaft 55. Fixed to shafts 54 and 55 are the clinching arms 50 and 51 which have above been described. Shafts 54 and 55 are journaled into upright portion 70b of the housing of the machine and they are also supported by a bracket 125 on said upright portion 70b. The action of these parts follows: When shaft 76 rotates, it carries cam 115 with it and causes the rocking arm to rock. Segment gear 119 moves arcuately upwardly and downwardly and causes meshed gear wheels 120 and 122 to turn in opposite directions in reciprocating fashion. Since these gear wheels are keyed to shafts 54 and 55 and since clinching arms 50 and 51 are also keyed to said shafts, the net result will be that said clinching arms will engage in arcuate movement about and on shafts 54 and 55 in opposite directions, that is, away from each other and then toward each other, etc.

Also mounted on shafts 54 and 55 are gear wheels 130 and 131 respectively. A cross bar 132 is fixed to the two gear wheels 130 and 131 to prevent them from rotating. The two shafts are free, however, to rotate in said gear wheels. A third gear wheel 133 is rotatably mounted on clinching arm 50 for engagement with gear wheel 130. A fourth gear wheel 134 is also rotatably mounted on clinching arm 50 for engagement with gear wheel 133. Lifting finger 45 has a downwardly extending portion 45a which is pinned to gear wheel 134. It will be apparent from the foregoing that when clinching arm 50 is caused to move arcuately on its shaft 54, it will carry gear wheels 133 and 134 and finger 45 along with it. Since gear wheel 130 remains stationary, gear wheel 133 will rotate or wheel about it. Since gear wheel 133 is in mesh with gear wheel 134, said latter gear wheel 134 will turn relative to clinching arm 50 but its angular position about its own axis will remain constant. In other words, gear wheel 134 will move on an arcuate line centered on the longitudinal axis of shaft 54, but said gear wheel will not turn on its own axis. Hence the angular position of lifting finger 45 will remain constant about the axis of gear wheel 134, although said lifting finger will move in an arcuate line also centered on the longitudinal axis of shaft 54. Lifting finger 45 will therefore always remain on a horizontal level, irrespective of its position relative to shaft 54 and relative to clinching arm 50.

Rotatably mounted on clinching arm 51 is a gear wheel 135 which meshes with gear wheel 131. More specifically, gear wheel 135 is mounted on a shaft 136 which has a diametrically extending hole formed therein. Arm 60 on which the gluing finger 61 is formed is rotatably mounted in said hole in shaft 136. A beveled gear 137 is fixed to clinching arm 51 in concentric relation to gear wheel 135 and shaft 136. A second bevel gear 138 is fixed to arm 60 for engagement with bevel gear 137. It will be apparent that when clinching arm 51 moves arcuately about the axial center of shaft 55, gear wheel 135 will engage in angular movement by reason of its engagement with fixed gear wheel 131. This will cause arm 60 to swing arcuately with said gear wheel 135. Since bevel gear 138 is in engagement with bevel gear 137, this arcuate movement of the gluing arm 60 will cause said arm to pivot in the diametrically extending hole which it occupies in shaft 136. It will thereby be caused to move from its solid line position in Fig. 9 to its dotted line position in the same figure and then back again. When it moves to its dotted line position, it brings its gluing finger 61 into glue pot 140 where said gluing finger takes on a quantity of glue for depositing upon or applying to the casing. It will be noted in the drawing that glue pot 140 is of the self heating variety to keep the glue in a liquid state. It may be found desirable to incorporate a heating element into gluing finger 61 so that the glue will not set during the course of the movement of said gluing finger 61 from its dotted line to its solid line position in Fig. 9. It will be understood that bevel gear 137 need not have its teeth extend about its entire circumference and the same is true of bevel gear 138 which may be flat on one side.

The foregoing is descriptive of a preferred form of this invention. It will be understood that modifications may be incorporated into this form of the invention and that other forms may be provided within the broad scope and spirit of the invention.

I claim:

In a sausage making machine, a rotatably mounted hollow shaft which has an inlet and an outlet end and which carries the sausage casing on its outlet end, a reciprocating pump which is connected to the inlet end of the hollow shaft and which pushes the sausage meat through the hollow shaft and into the sausage casing on its forward stroke and which tends to pull the sausage meat back from the sausage casing on its backward stroke, a casing lifter which is mounted adjacent the outlet end of the hollow shaft and which lifts the casing into axial alignment with the hollow shaft, a casing clincher mounted adjacent the casing lifter for pinching off the casing and means connected to the hollow shaft for rotating said hollow shaft to twist the sausage casing, said pump, lifter, casing clincher and rotating means being synchronized so that the casing is lifted and pinched off at the conclusion of the forward stroke of the pump, and the backward stroke is begun before the start of the casing twisting operation, whereby a suction force is applied to the casing to hold it tightly upon the hollow shaft during the casing twisting operation.

WILLIAM KOFLER.

References Cited in the file of this patent

UNITED STATES PATENTS

| Number | Name | Date |
|---|---|---|
| 523,331 | Dexter | July 24, 1894 |
| 527,009 | Bazerque | Oct. 2, 1894 |
| 1,759,587 | Parker | May 20, 1930 |
| 1,790,868 | Knoll | Feb. 3, 1931 |
| 2,168,693 | Walter | Aug. 8, 1939 |